United States Patent
Lee (10) Patent No.: US 12,380,227 B2
(45) Date of Patent: Aug. 5, 2025

(54) ENCRYPTION COMPUTING SYSTEM AND ENCRYPTION METHOD

(71) Applicant: SAMSUNG ELECTRONICS CO., LTD., Suwon-si (KR)

(72) Inventor: Wi Jik Lee, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 119 days.

(21) Appl. No.: 17/994,115

(22) Filed: Nov. 25, 2022

(65) Prior Publication Data

US 2023/0169187 A1    Jun. 1, 2023

(30) Foreign Application Priority Data

Dec. 1, 2021  (KR) ......................... 10-2021-0169752

(51) Int. Cl.
  *G06F 21/60* (2013.01)
  *G06F 7/544* (2006.01)
  *G06F 21/79* (2013.01)

(52) U.S. Cl.
  CPC .......... *G06F 21/602* (2013.01); *G06F 7/5443* (2013.01); *G06F 21/79* (2013.01)

(58) Field of Classification Search
  CPC ..... H04L 9/008; G06F 7/5443; G06F 21/602; G06F 21/79
  USPC ....................................................... 726/26
  See application file for complete search history.

(56) References Cited

U.S. PATENT DOCUMENTS

| | | | |
|---|---|---|---|
| 8,837,715 B2 | 9/2014 | Troncoso Pastoriza et al. | |
| 9,716,590 B2 | 7/2017 | Gentry | |
| 9,742,556 B2 | 8/2017 | Bacon et al. | |
| 9,742,566 B2 | 8/2017 | Gentry et al. | |
| 9,946,970 B2 | 4/2018 | Gilad-Bachrach et al. | |
| 10,211,974 B2 | 2/2019 | Seo et al. | |
| 10,541,805 B2 * | 1/2020 | Laine | H04L 9/008 |

(Continued)

FOREIGN PATENT DOCUMENTS

| KR | 20210042668 A | 4/2021 |
|---|---|---|
| WO | WO 2020/235797 A1 | 11/2020 |

OTHER PUBLICATIONS

European Search Report Dated Apr. 20, 2023, Cited in Corresponding EP Application No. EP 22 210 665.0.

(Continued)

*Primary Examiner* — Amare F Tabor
(74) *Attorney, Agent, or Firm* — Fish & Richardson P.C.

(57) ABSTRACT

An encryption computing system may include; a processor performing calculations between homomorphic encrypted data including cyphertexts, and a non-volatile memory device storing the homomorphic encrypted data. The processor performs a first multiplication between a first cyphertext and a second cyphertext to generate a first intermediate cyphertext, performs a second multiplication between the first intermediate cyphertext and a third cyphertext to generate a second intermediate cyphertext, performs a third multiplication between the second intermediate cyphertext and a fourth cyphertext to generate a third intermediate cyphertext, and thereafter, performs a rescaling calculation on the third intermediate cyphertext using a cumulative scaling factor to generate the homomorphic encrypted data, wherein the cumulative scaling factor is defined in relation to the first multiplication, the second multiplication and the third multiplication.

20 Claims, 6 Drawing Sheets

(56) References Cited

U.S. PATENT DOCUMENTS

| | | | |
|---|---|---|---|
| 10,778,409 B2 * | 9/2020 | Cheon .................... | H04L 9/3093 |
| 10,924,262 B2 | 2/2021 | Shim et al. | |
| 11,196,539 B2 * | 12/2021 | Lauter ..................... | H04L 9/088 |
| 11,368,279 B2 * | 6/2022 | Hoshizuki ................ | G06N 3/04 |
| 11,374,735 B2 * | 6/2022 | Hoshizuki .............. | G06N 3/045 |
| 11,431,470 B2 * | 8/2022 | Jiang ..................... | H04L 9/0631 |
| 11,757,618 B2 * | 9/2023 | Cheon .................... | H04L 9/3093 |
| | | | 380/28 |
| 11,895,219 B2 * | 2/2024 | Lim ........................ | G09C 1/00 |
| 2019/0312719 A1 | 10/2019 | Cheon et al. | |
| 2019/0349362 A1 | 11/2019 | Cheon et al. | |
| 2020/0036511 A1 | 1/2020 | Cheon et al. | |
| 2020/0162235 A1 | 5/2020 | Cheon et al. | |
| 2020/0169384 A1 | 5/2020 | Cheon et al. | |
| 2020/0228307 A1 | 7/2020 | Cheon et al. | |
| 2020/0252199 A1 | 8/2020 | Cheon et al. | |
| 2020/0266974 A1 | 8/2020 | Cheon et al. | |
| 2020/0274709 A1 | 8/2020 | Cheon et al. | |
| 2020/0374103 A1 | 11/2020 | Cheon | |

OTHER PUBLICATIONS

European First Office Action Dated May 4, 2023, Cited in Corresponding EP Application No. EP 22 210 665.0.

Kyoohyung Han et al: "Efficient Logistic Regression on Large Encrypted Data", IACR, International Association for Cryptologic Research.

* cited by examiner

| r<br>(Frequency of Rescaling) | # of<br>(INTT+NTT) | # of<br>Base conversion |
|---|---|---|
| 1 | 1230 | 40 |
| 3 | 410 | 114 |
| 10 | 123 | 310 |

ENCRYPTION COMPUTING SYSTEM AND ENCRYPTION METHOD

CROSS-REFERENCE TO RELATED APPLICATION

This application claims priority under 35 U.S.C. 119 to Korean Patent Application No. 10-2021-0169752 filed on Dec. 1, 2021 in the Korean Intellectual Property Office, the subject matter of which is hereby incorporated by reference in its entirety.

BACKGROUND

The inventive concept relates generally to encryption computing systems and encryption methods. More particularly, the inventive concept relates to homomorphic encryption computing systems and homomorphic encryption methods.

In certain cloud computing environments, user data may be received and stored on a server. Upon subsequent demand by the user (e.g., a request received through a user terminal device), user data may be accessed from the server. In order to ensure privacy of the user data and protect the user's personal information, user data must be encrypted and the resulting encrypted user data may be safely stored on the server.

In order to access specific encrypted user data on the server, it is necessary to decrypt the encrypted user data individually as the user data is searched or as various operations (e.g., calculations) are performed on the user data. This approach is not highly efficient. Further, it is possible that user data may be accessed by an unauthorized third party when the user data is temporarily (or incidentally) decrypted during such operations.

In order to address this potential problem, homomorphic encryption methods have been widely investigated. During homomorphic encryption, data may be operated upon (e.g., calculated) in an encrypted state, and a corresponding calculation result may then be decrypted to obtain an unencrypted (e.g., plaintext) calculation result. Accordingly, homomorphic encryption methods enable necessary calculations and provide corresponding calculation results without exposing user data to unauthorized hacking.

Thus, homomorphic encryption is able to efficiently operate on encrypted user data. However, during homomorphic encryption calculations, a multiplication calculation (or operation) should include a rescaling calculation, wherein the rescaling calculation occupies a significant portion of the overall multiplication calculation. Not surprisingly, when a plurality of multiplication calculations is performed, the corresponding calculation speed is markedly slowed due to the repeated performance of the rescaling calculations.

SUMMARY

Embodiments of the inventive concept provide homomorphic encryption methods and homomorphic encryption devices exhibiting improved calculation speed.

In an embodiment of the inventive concept, an encryption computing device includes; a processor configured to perform calculations between homomorphic encrypted data, and a non-volatile memory device storing the homomorphic encrypted data, wherein the homomorphic encrypted data includes a plurality of cyphertexts. The processor is further configured to perform a first multiplication between a first cyphertext and a second cyphertext to generate a first intermediate cyphertext, perform a second multiplication between the first intermediate cyphertext and a third cyphertext to generate a second intermediate cyphertext, perform a third multiplication between the second intermediate cyphertext and a fourth cyphertext to generate a third intermediate cyphertext, and thereafter, perform a rescaling calculation on the third intermediate cyphertext using a cumulative scaling factor to generate the homomorphic encrypted data, wherein the cumulative scaling factor is defined in relation to the first multiplication, the second multiplication and the third multiplication.

In an embodiment of the inventive concept, an encryption computing system includes; a processor configured to receive data and perform homomorphic encryption on the data to generate homomorphic encrypted data, and a non-volatile memory device storing the homomorphic encrypted data and storing a cyphertext calculation program, wherein the encrypted data includes a plurality of cyphertexts, wherein the processor is further configured to: successively perform N multiplication calculations on the plurality of cyphertexts to generate an intermediate cyphertext, and perform M rescaling calculations on the intermediate cyphertext, wherein M is less than N, where each of N and M is an integer greater than or equal to 1.

In an embodiment of the inventive concept, a server includes; a controller configured to communicate with another server, perform homomorphic encryption on received data to generate homomorphic encrypted data including a plurality of cyphertexts, and decrypt the homomorphic encrypted data, and a memory device storing the homomorphic encrypted data, wherein the controller is further configured to: perform N multiplication calculations between at least two cyphertexts among the plurality of cyphertexts to generate n intermediate cyphertexts, and thereafter, perform M rescaling calculations on the n intermediate cyphertexts, wherein M is less than N, and each of N, M and n is an integer greater than or equal to 1.

BRIEF DESCRIPTION OF DRAWINGS

Advantages, benefits, and feature, as well as the making and use of the inventive concept may be understood upon consideration of the following detailed description, together with the accompanying, in which.

DETAILED DESCRIPTION

Throughout the written description and drawings, like reference numbers and labels are used to denote like or similar elements, components, features and/or method steps.

Terms such as "unit", "module", etc., as well as functional blocks shown in the drawings may be variously implemented in hardware, firmware and/or software.

Terms such as "program" or "software" may be understood as any type of a computer code or a set of processor-executable instructions that may be used to program a computer or another processor so as to implement various aspects of the illustrated embodiments.

Aspects of the inventive concept relate to encryption, and more particularly to homomorphic encryption. Homomorphic encryption refers to an encryption approach (e.g., an encryption method or an encryption computation) during which encrypted data may be operated upon (or calculated). A calculation result using cyphertexts becomes a new cyphertext, and a plaintext obtained by decrypting the new cyphertext is substantially the same as a calculation result of an original data before the encryption.

In this regard, homomorphic encryption includes fully homomorphic encryption in which a somewhat homomorphic encryption that supports addition and multiplication calculations of a limited number of times may be designed, as well as subsequent squashing and bootstrapping operations that may be used to create a new cyphertext exhibiting reduced noise.

Figure 1:
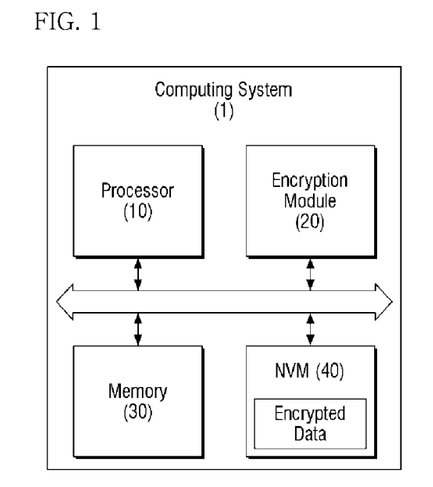
FIG. 1 is a block diagram illustrating an encryption computing device according to embodiments of the inventive concept.
Figure 2:
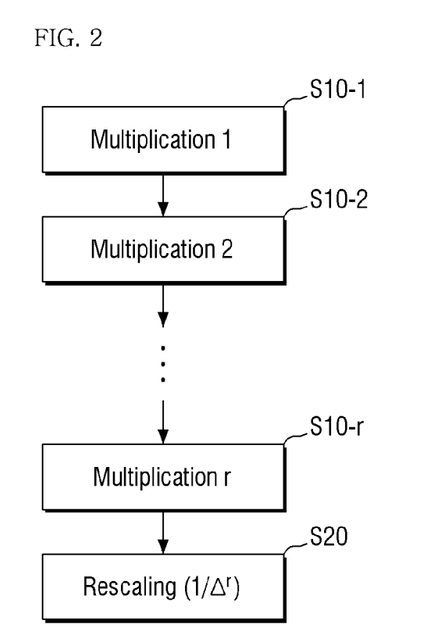
FIG. 2 is a flowchart further illustrating in one example the operation of the encryption module of FIG. 1.
Figure 3:
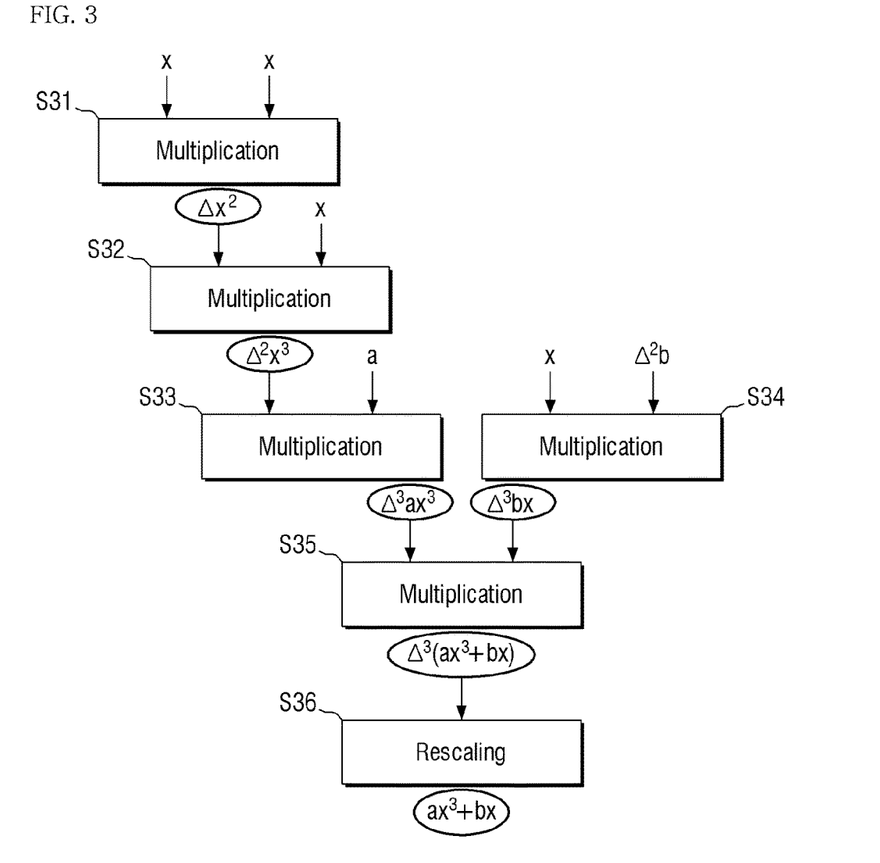
FIG. 3 is a flowchart further illustrating in another example the operation of the encryption module of FIG. 1.

Figure (FIG. 1 is a block diagram illustrating an encryption computing device 1 according to embodiments of the inventive concept; FIG. 2 is a flowchart further illustrating in one example the operation of the encryption module 20 of FIG. 1; and FIG. 3 is a flowchart further illustrating in another example the operation of the encryption module 20 of FIG. 1.

Referring to FIG. 1, the encryption computing device 1 may include a processor 10, the encryption module 20, a memory 30, and a non-volatile memory device 40.

Although not shown in FIG. 1, the computing system 1 may further include an input/output (I/O) interface configured to connect the computing system 1 with one or more external devices. In this regard, the computing system 1 may be connected to the external device(s) via a hardwired link, a local area network, an Internet network, and/or a wireless link.

The processor 10 may be used to control the overall operation of the computing system 1. Accordingly, the computing system 1 may receive a calculation command via the I/O interface or the processor 10. Here, the calculation command may invoke execution of, for example, an addition operation, a multiplication operation, or an averaging operation on encrypted data stored in the non-volatile memory device 40 and/or plaintext data received through the I/O interface.

The encryption module 20 may be used to: (1) perform homomorphic encryption of received plaintext data in order to generate corresponding encrypted data, and (2) perform a homomorphic encryption calculation on encrypted data retrieved from the non-volatile memory device 40 in order to generate encrypted data, or in order to covert encrypted data into corresponding plaintext data. In this regard, "plaintext data" may include a plurality of plaintexts, and the "encrypted data" may includes a plurality of cyphertexts.

Exemplary configuration and operation of the encryption module 20 will be described hereafter in some additional detail with reference to FIGS. 2, 3, 4, 5, 6 7, 8 and 9.

In some embodiments, the memory 30 may be a volatile and/or non-volatile memory capable of receiving, storing and retrieving data under the control of the processor 10, as determined by programming code or commands executed by the processor 10. The memory 30 may serve as a scratch pad memory or temporary cache memory storing certain calculation results generated by operation of the processor 10 and/or the encryption module 20. In some embodiments, the memory 30 may include a Read Only Memory (ROM), a Programmable ROM (PROM), an Erasable PROM (EPROM), an Electrically Erasable PROM (EEPROM), a Random Access Memory (RAM), a Phase-change RAM (PRAM), a flash memory, a Static RAM (SRAM), and/or a Dynamic RAM (DRAM).

The non-volatile memory device 40 may be used to store encrypted data calculated by the encryption module 20.

In some embodiments, the non-volatile memory device 40 may include a flash memory, or a resistive memory, such as a resistive RAM (ReRAM), a PRAM, and/or a Magnetic RAM (MRAM). Alternately or additionally, the non-volatile memory device may be implemented as a storage device, such as for example, a smart card, a secure digital (SD) card, a multimedia card (MMC), an embedded MMC (eMMC), an embedded multi-chip package (eMCP), a perfect page NAND (PPN), a universal flash storage (UFS), a USB flash drive, a solid state drive (SSD), and/or an embedded SSD (eSSD).

The processor 10, encryption module 20, memory 30, and non-volatile memory device 40 may be variously interconnected using one or more signal(s) lines and/or bus(es). In this regard, a constituent data bus may include a plurality of channels. In some embodiments, each of the plurality of channels may be an independently-operating communication path, and each of the plurality of channels may communicate with various connected devices in accordance with one or more conventionally-understood data communications protocols and related technical standards.

Hereinafter, an exemplary encryption operation that may be performed by the encryption module 20 of FIG. 1 will be described in some additional detail with reference to FIGS. 2 and 3.

Upon receiving a calculation command, the encryption module 20 may perform an indicated calculation (e.g., multiplication, addition, averaging, etc.) on cyphertext. For example, a calculation command may indicate a plurality of multiplication calculations (hereafter also referred to as, "multiplications") and/or a plurality of addition calculations (hereafter also referred to as, "additions"). Such calculations may be performed on plaintext to generate homomorphic cyphertext.

In some embodiments, the cyphertext may include a plaintext message and an encryption error value. When using a scaling factor, not only a message in a form of an integer, but also a message in a form of a real number may be encrypted. A message size may be adjusted in accordance with a scaling factor, and thereafter the calculation may be performed. Thus, the size of an area in which messages may exist in the cyphertext as calculation results (e.g., the size of an effective area) may be adjusted.

However, when the cyphertext is multiplied by the scaling factor, a length (size) of the message may be adjusted. For a multiplication calculation or a division calculation, a length of the message may be increased or decreased—which is not the case for an addition calculation and a subtraction calculation. When the encryption module 20 performs a multiplications calculation in response to the calculation command in relation to a scaling factor of 1 or greater, the resulting message length may become very large. Thus, a rescaling calculation may be used to adjust (or reduce) the large message length resulting from the multiplications to an original message length associated with the ciphertext.

For example, when a calculation command indicates the execution of multiplications, the encryption module 20 may continuously perform a sequence of multiplication calculations (e.g., 'r' times, where 'r' is a natural number greater than 1) on cyphertext (e.g., method steps S10-1 to S10-r). Then, after performing all of the r-times multiplication calculations, the encryption module 20 may perform a rescaling calculation so that a length of a recalculation result is the same as a length of the cyphertext before performing the multiplication calculations (S20). In this regard, the rescaling calculation refers to applying an "inverse" (e.g., an inverse number or inverse value) $\Delta^{-1}$ of the scaling factor by an exponent power (r) of a cumulative scaling factor in the multiplication calculations ($1/\Delta^r$).

In some embodiments like the example illustrated in FIG. 3, it may be assumed that the calculation command includes a polynomial calculation of ($ax^3+bx$) for a cyphertext 'x'. In this regard, a last polynomial ($ax^3+bx$) may be a sum of a first polynomial ($ax^3$) and a second polynomial ($bx$). Accordingly, in the flowchart of FIG. 3, each of the values expressed within a circle indicates a calculation result from a calculation performed in a previous operational stage, and each of values expressed outside of a circle indicate a new input value, such as a cyphertext or a coefficient.

Thus, when a first multiplication calculation between a first cyphertext (x) and a second cyphertext (x) is performed (S31), a first calculation result (e.g., a first intermediate cyphertext) of ($\Delta x^2$) results—in which the multiplication value ($x^2$) between the first cyphertext and the second cyphertext is multiplied by a scaling factor ($\Delta$) for the first multiplication calculation.

The, when a second multiplication calculation between the first calculation result ($\Delta x^2$) and a third cyphertext (x) is performed (S32), a second calculation result (e.g., a second intermediate cyphertext) of ($\Delta^2 x^3$) results—in which the first calculation result ($\Delta x^2$) is multiplied by a scaling factor ($\Delta$) for the second multiplication calculation.

The, when a third multiplication calculation between the second calculation result ($\Delta^2 x^3$) and a coefficient (a) is performed (S33), a third calculation result (e.g., a third intermediate cyphertext) of ($\Delta^3 ax^3$) results—in which the second calculation result ($\Delta^2 ax^3$) is multiplied by a scaling factor ($\Delta$) for the third multiplication.

In order to "combine" (e.g., adding or subtracting) the second polynomial ($bx^2$) to the third calculation result ($\Delta^3 ax^3$), a scaling factor $\Delta^3$ of the same order must be applied to the second polynomial. Thus, in order to obtain the polynomial ($bx^2$) to which the scaling factor of the same order is applied, a fourth multiplication calculation between a fourth cyphertext (x) and a coefficient ($\Delta^2 b$) to which a scaling factor $\Delta^2$ has already been applied is performed (S34). Accordingly, a fourth calculation result (e.g., a fourth intermediate cyphertext) ($\Delta^3 bx$) results—in which a scaling factor $\Delta$ for the fourth multiplication is applied.

The, when the third calculation result ($\Delta^3 ax^3$) and the fourth calculation result ($\Delta^3 bx$) are combined (e.g., added), a fifth calculation result becomes [$\Delta^3(ax^3+bx)$] (S35). Finally, a rescaling calculation may be performed (S36). Here, the rescaling calculation removes the cumulative scaling factor $\Delta^3$ from the fifth calculation result (e.g., the fifth intermediate cyphertext). That is, the rescaling calculation result may divide the fifth calculation result [$\Delta^3(ax^3+bx)$] by the cumulative scaling factor $\Delta^3$ of the first multiplication calculation to the fourth multiplication calculation in order to generate (or calculate) a cyphertext as a last polynomial ($ax^3+bx$).

Figure 4:
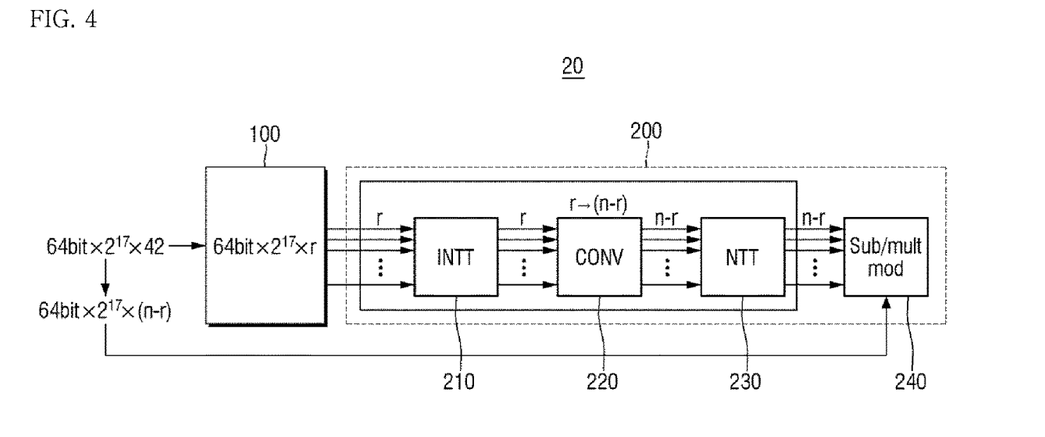
FIG. 4 is a block diagram further illustrating an encryption technique that may be performed by the encryption module of FIG. 1.

FIG. 4 is a block diagram illustrating an encryption technique according to embodiments of the inventive concept in the context of the encryption module 20 of FIG. 1.

Here, it is assumed that the scaling factor $\Delta$ is r. That is, a modulus of the cyphertext may be set in a form of an exponent power of the scaling factor $\Delta$.

For example, where an assumed input is [64 bit×$2^{17}$×r] (100), where "64 bit" denotes the cyphertext, and "$2^{17}$" denotes the modulus, a rescaling calculation may be performed once every 'r' (e.g., 17 ties) in order to accomplish a number of homomorphic multiplications. That is, in the working example of FIG. 4, it is assumed that a total of 42 multiplication calculations will be performed.

In some embodiments, the encryption module 20 may include a multiplication module 100 and a rescaling module 200. In some embodiments, the multiplication module 100 may be configured to perform multiplication calculations on homomorphic cyphertext using, for example, a Ring Learning With Errors (RLWE) approach. In some embodiments, the rescaling module 200 may include an Inverse Number Theory Transform (INTT) module 210, a base conversion module 220, and a Number Theory Transform (NTT) module 230.

Assuming that the encryption module 20 performs INTT calculation(s) on input cyphertexts a 'k' number of times, where 'k' is an integer greater than 1, the encryption module 20 may perform NTT calculation an (n−k) number of times, where 'n' is an integer greater than 'k'. That is, when the encryption module 20 performs 'n' multiplication calculations, the encryption module 20 may also perform base conversion calculation(s) (e.g., Ring calculation a [k(n−k)] number of times).

The INTT module 210 may convert a vectorized cyphertext into a non-vectorized (e.g., a polynomial) format suitable for calculation(s). And the NTT module 230 may be used to restore (or vectorize) the non-vectorized calculation result into the cyphertext.

In order to perform 'r' multiplication calculations at the same time, the INTT module 210 may convert the cyphertext into a polynomial form using via parallel INTT calculations.

The base conversion module 220 may performs Ring calculations on the converted cyphertext a [k(n−k)] number of times. Thereafter, extending the illustrated example of FIG. 4, (42-r) multiplication calculations may be performed, and the NTT module 230 may perform NTT calculation(s) on (42-r) cyphertexts in order to covert same to their original form.

The calculation module 240 may perform multiplication(s) and/or addition(s) between the NTT calculation results and apply the calculation results to the existing cyphertext {64 bit×$2^{17}$×(42-r)} and thereafter output the results.

By way of comparison with examples in which a rescaling calculation is performed after each of a number of multiplications—especially in a circumstance in which multiplications of $64^{bit} \times 2^{17}$ are performed, embodiments of the inventive concept may include a multiplication module (e.g., multiplication module 100 of FIG. 4) configured to continuously (e.g. sequentially) perform 'r' multiplications in order to generate a multiplication result. Additionally, embodiments of the inventive concept may include a rescaling module (e.g., rescaling module 200 of FIG. 4) configured to perform a rescaling calculation on the multiplication calculation. In this regard, the total number of NTT calculations and INTT calculations may be reduced, thereby increasing the operational (or calculation) speed of the encryption module 20 and/or the computing system 1. And further in this regard, a total number of rescaling calculations may be reduced in relation to a total the number of multiplication calculations.

Figure 5:
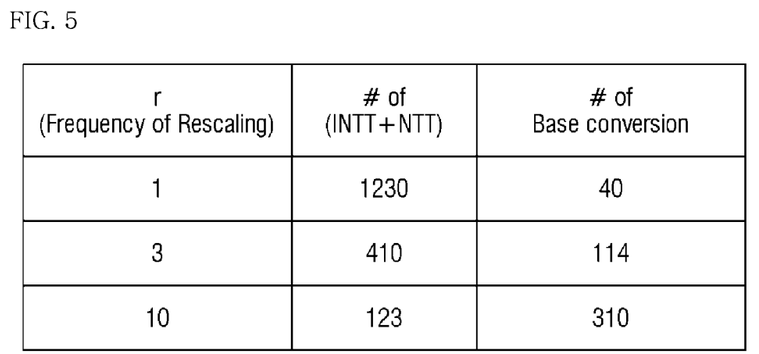
FIG. 5 is a table listing a number of rescaling calculation times for the encryption method according to the embodiment of FIG. 4.

FIG. 5 is a table listing exemplary options for rescaling frequency that may be used in encryption methods according to embodiments of the inventive concept. Referring to FIG. 5, when the rescaling calculation is performed once every 'r' multiplication calculations, the total number of NTT calculations and INTT calculations may be reduced according to an inverse function of rescaling calculation frequency (or 1/r).

For example, if a rescaling calculation is performed for one (1) multiplication calculation, the total number of (INTT+NTT) calculations may equal 1230 and a total number of Ring calculation may be 40. Alternately, if a rescaling calculation is performed for every three (3) multiplication calculations, the total number of (INTT+NTT) calculations may be reduced to 410 (e.g., ⅓ of 1230 for 'r' values of 1 and 3) and a total number of Ring calculations may increase to 114. And alternately, if a rescaling calculation is performed for every ten (10) multiplication calculations, the total number of (INTT+NTT) calculations may be reduced to 123 (e.g., 1/10 of 1230 for 'r' values of 1 and 10) and the total number of Ring calculations may increase to 310.

Figure 6:
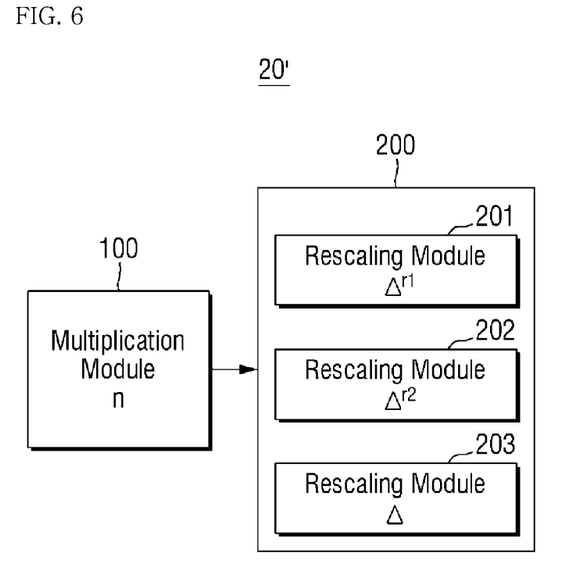
FIG. 6 is a conceptual diagram further illustrating an encryption module according to embodiments of the inventive concept.
Figure 7:
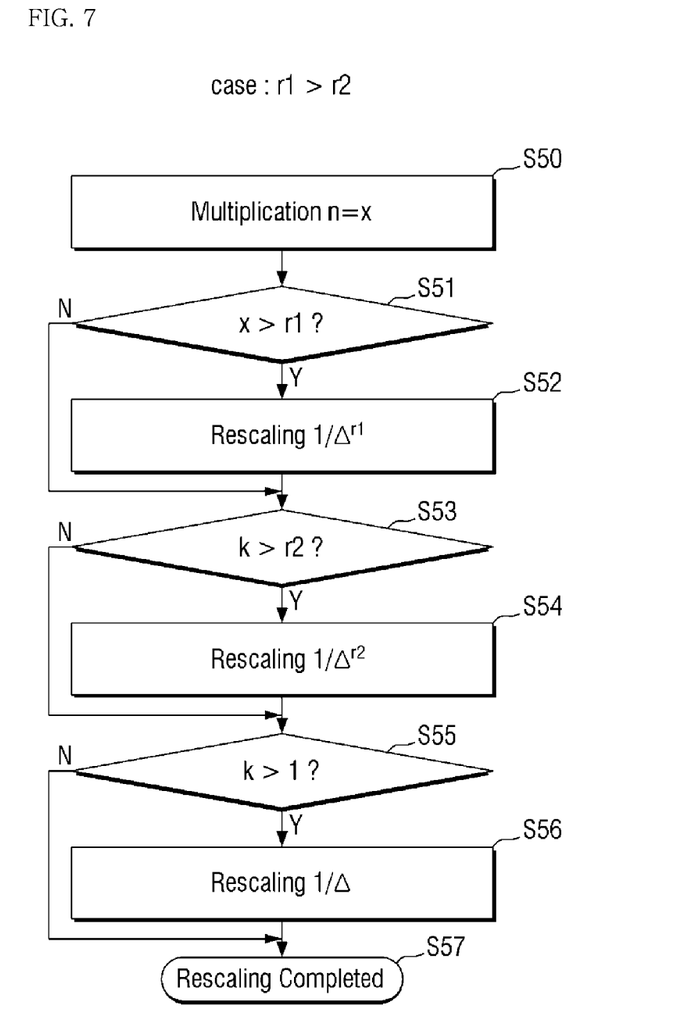
FIG. 7 is a flowchart illustrating an encryption method according to embodiments of the inventive concept.

FIG. 6 is a block diagram further illustrating in another possible embodiment (20') the encryption module 20 of FIG. 1, and FIG. 7 is a flowchart illustrating in one example an encryption method according to embodiments of the inventive concept.

Referring to FIG. 6, the encryption module 20' may include at least two rescaling modules respectively configured to provide at least two inverses for a scaling factor. Thus, in some embodiments, the encryption module 200 may include a first rescaling module 201 configured to perform a rescaling calculation using a first scaling factor $\Delta^{r1}$; a second rescaling module 202 configure to perform the rescaling calculation using a second scaling factor $\Delta^{r2}$; and a third rescaling module 203 configured to perform the rescaling calculation using a third scaling factor $\Delta$.

As will be appreciated, the first scaling factor $\Delta^{r1}$, the second scaling factor $\Delta^{r2}$, and the third scaling factor $\Delta$ may have different values. For example, the first scaling factor $\Delta^{r1}$ may have a highest value, the second scaling factor $\Delta^{r2}$ may have an intermediate value, and the third scaling factor $\Delta$ may have a lowest value. Alternately expressed, an inverse $1/\Delta^{r1}$ of the first scaling factor may have a lowest value, an inverse $1/\Delta^{r2}$ of the second scaling factor may have an intermediate value, and an inverse $1/\Delta$ of the third scaling factor may have a highest value.

Referring to the flowchart of FIGS. 6 and 7, it is assumed that 'n' multiplication calculations are performed (S50), and that an exponent of the scaling factor $\Delta$ increases in relation to the multiplication calculations by 'x' calculations. If an exponent 'x' of a cumulative scaling factor is greater than an exponent r1 of the first scaling factor, or (x>r1), such that S51=Yes, the first rescaling module 201 may perform the rescaling calculation using $1/\Delta^{r1}$ (S52). However, if the exponent 'x' of the cumulative scaling factor is less than the exponent r1 of the first scaling factor, or (x<r1), such that S51=No, the second rescaling module 202 may perform a determination operation.

Then, if the second rescaling module 202 determines that the exponent 'k' of the scaling factor of the calculation result of the first rescaling module 201 or the exponent 'x' of the cumulative scaling factor is greater than an exponent r2 of the second scaling factor, or [(k>r2) or (x>r2)], such that S53=Yes, the second rescaling module 202 may perform the rescaling calculation using $1/\Delta^{r2}$ (S54). However, if the exponent 'k' of a current cumulative scaling factor is less than the exponent r2 of the second scaling factor, or (k<r2), such that S53=No, the third rescaling module 203 may performs a determination operation.

Then, if the third rescaling module 203 determines that the exponent 'k' of the scaling factor of the calculation result of the second rescaling module 202 or the exponent 'k' of the cumulative scaling factor is greater than an exponent of the third scaling factor, or (k>1), such that S55=Yes, the third rescaling module 203 may perform the rescaling calculation using $1/\Delta$ (S56), and the rescaling calculation is completed.

Again extending the example of FIG. 4 in the context of FIGS. 6 and 7, it is assumed that 42 multiplication calculations are performed. When all of the multiplication calculations are complete, the exponent of the scaling factor may be multiplied 42 times. Thus, the cumulative scaling factor becomes $\Delta^{42}$. It is further assumed that the first rescaling module 201, the second rescaling module 202 and the third rescaling module 203 operate, respectively, using r1=10 for the first rescaling module, r2=5 for the second rescaling module, and r=1 for the third rescaling module. Under these exemplary assumptions, the cumulative scaling factor $\Delta^{42}$ may be $\Delta^{(10 \times 4 + 2)}$. That is, the first rescaling module 201 may apply $1/\Delta^{10}$ 4 times and the third rescaling module 203 may apply $1/\Delta^1$ twice. In this manner, rescaling may be completed.

Accordingly, a total number of (INTT+NTT) calculations may be equal to or greater than 42 when the rescaling calculation is performed for each multiplication calculation. However, consistent with the example of the FIG. 4, the total number of (INTT+NTT) calculations may be reduced to 8 (e.g., 4×2) which has the effect of increasing the homomorphic encryption speed and reducing the overall calculation load placed upon the processor 10 and memory 30 of the computing system 1 of FIG. 1.

Figure 8:
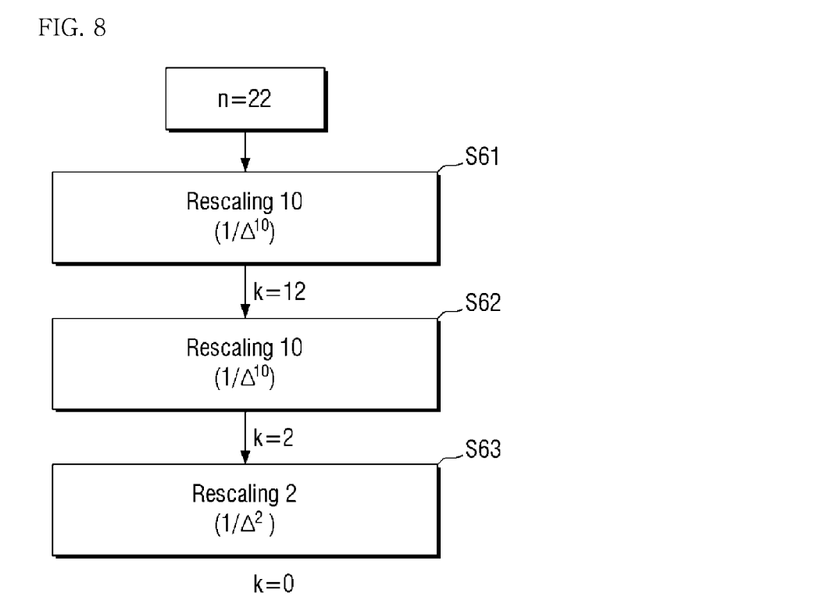
FIGS. 8 and 9 are respective flowcharts illustrating a rescaling calculation according to embodiments of the inventive concept.
Figure 9:
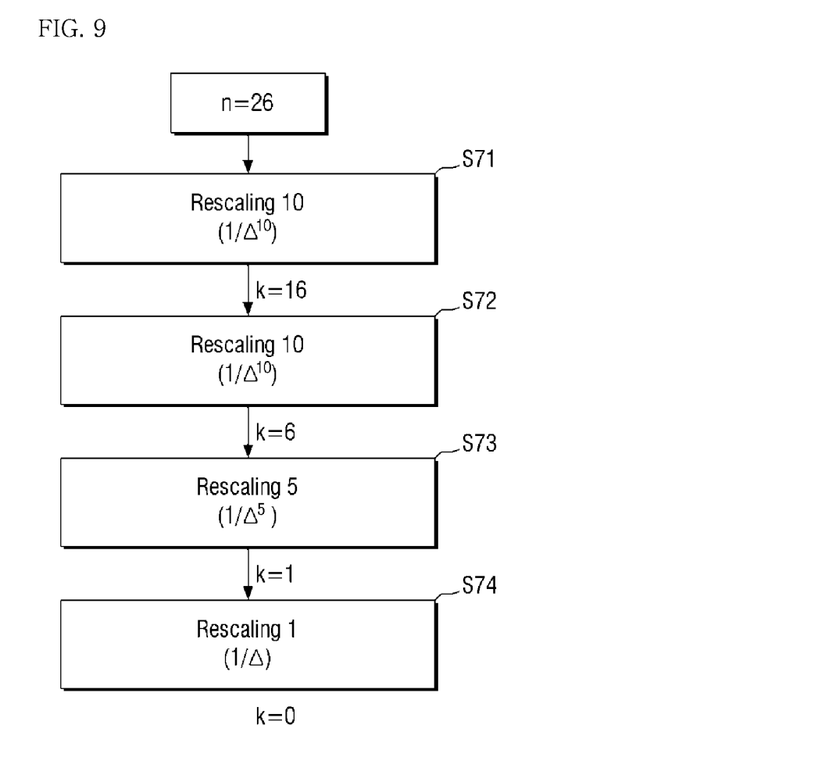

FIGS. 8 and 9 are respective flowcharts illustrating a rescaling calculation according to embodiments of the inventive concept.

Referring to FIGS. 6 and 8, it is again assumed that the first rescaling module 201, the second rescaling module 202 and the third rescaling module 203 respectively operate in relation to r1=10 for the first rescaling module, r2=5 for the second rescaling module, and r=2 for the third rescaling module.

It is further assumed that a total of 22 multiplication calculations (e.g., n=22) are performed. When the first rescaling module 201 performs a first rescaling calculation (e.g., $1/\Delta^{10}$) (S61), an exponent 'k' of the cumulative scaling factor may become 12, (e.g., k=22−10). When the first rescaling module 201 performs a second rescaling calculation ($1/\Delta^{10}$) (S62), an exponent 'k' of the cumulative scaling factor may become 2, (e.g., k=12−10). And when the third rescaling module 203 performs a rescaling calculation (e.g., $1/\Delta^2$) (S63), an exponent 'k' of the cumulative scaling factor may become 0.

Referring to FIGS. 6 and 9, and by way of comparison with the example of FIG. 8, it is again assumed that the first rescaling module 201, the second rescaling module 202 and the third rescaling module 203 respectively operate in relation to r1=10 for the first rescaling module, r2=5 for the second rescaling module, and r=1 for the third rescaling module.

It is further assumed that a total of 26 multiplication calculations (n=26) are performed. When the first rescaling module 201 performs a first rescaling calculation (e.g., $1/\Delta^{10}$) (S71), an exponent 'k' of the cumulative scaling factor may become 16 (e.g., k=26−10. When the first rescaling module 201 performs a second rescaling calculation ($1/\Delta^{10}$) (S72), an exponent 'k' of the cumulative scaling factor may become 6 (e.g., k=16−10). When the second rescaling module 202 performs the rescaling calculation (e.g., $1/\Delta^5$) (S73), an exponent 'k' of cumulative scaling factor may become 1 (e.g. k=6−5). And when the third rescaling module 203 performs the rescaling calculation (e.g., $1/\Delta^1$) (S74), an exponent 'k' of the cumulative scaling factor may become 0.

Thus, as further illustrated by the embodiments of FIGS. 8 and 9, rescaling calculation(s) for a homomorphic encryption method according to embodiments of the inventive concept may significantly reduce a total number of (INTT+NTT) calculations. That is, a number of rescaling calculations may be markedly less than a number of multiplication calculations, as compared with methods performing a rescaling calculation for each multiplication calculation. As a result, the relatively fewer rescaling calculations reduces an overall processing (or calculation) load, thereby increasing the calculation speed of a homomorphic cyphertext.

Figure 10:
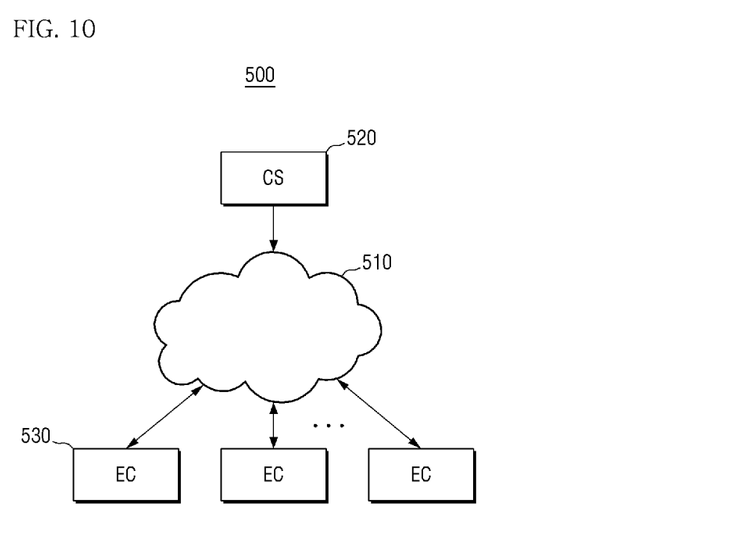
FIG. 10 is a conceptual diagram illustrating a cloud computing environment that may include a computing device according to embodiments of the inventive concept.

FIG. 10 is a conceptual diagram illustrating a cloud computing environment that may include a computing system consistent with embodiments of the inventive concept.

Referring to FIG. 10, at least one edge computer (EC) 530 and at least one cloud computing device (CS) 520 may be configured to communicate through a network 510.

The network 510 may employ hardwired and/or wireless data communication schemes. For example, wireless communication may be accomplished using, for example; a cellular communication network (e.g., LTE, LTE-A (LTE Advance), code division multiple access (CDMA), wideband CDMA (WCDMA), universal mobile telecommunications system (UMTS), Wireless Broadband (WiBro), and/or Global System for Mobile Communications (GSM). Alternately or additionally, wireless communication may be accomplished using, for example; wireless fidelity (WiFi), light fidelity (LiFi), Bluetooth, Bluetooth Low Energy (BLE), Zigbee, near field communication (NFC), Magnetic Secure Transmission, radio frequency (RF), and/or body area network (BAN). Alternately or additionally, wireless communication may be accomplished using, for example; include a Global Navigation Satellite System (GNSS), such as Global Positioning System (GPS), Glonass, Beidou, and/or the European global satellite-based navigation system. Hardwired communication may be accomplished using, for example; universal serial bus (UBS), high definition multimedia interface (HDMI), Recommended Standard 232 (RS-232), power line communication, plain old telephone service (POTS), and/or a computer network, such as LAN or WAN.

The edge computer 530 may be a computing device by which a user may access user data and which may function in accordance with a distributed open architecture to provide distributed processing performance. The edge computer 530 may include, for example; a smartphone, a tablet personal computer (PC), a mobile phone, an image phone, an e-book reader, a desktop PC, a laptop PC, a netbook computer, a workstation, a server, a personal data assistant (PDA), a portable multimedia player (PMP), an MP3 player, a medical device, a camera, and/or a wearable device. The wearable device may include at least one of accessory types of wearable devices such as watches, rings, bracelets, anklets, necklaces, glasses, contact lenses, or head-mounted-device (HMD), textile or clothing-integrated wearable devices such as electronic clothing, a body-attached wearable device such as a skin pad or a tattoo, or a bio-implantable circuit. In some embodiments, the electronic device may include, for example, at least one of a television, a digital video disk (DVD) player, an audio, a refrigerator, an air conditioner, a vacuum cleaner, an oven, a microwave oven, a washing machine, an air purifier, a set-top box, a home automation control panel, a security control panel, a media box (e.g. Samsung HomeSync™, Apple TV™, or Google TV™), a game console (e.g. Xbox™, PlayStation™), an electronic dictionary, an electronic key, a camcorder, or an electronic frame.

The electronic device may include at least one of various medical devices such as portable medical devices (e.g., blood glucose monitors, heart rate monitors, blood pressure monitors, or body temperature monitors), magnetic resonance angiography (MRA) devices, magnetic resonance imaging (MRI) devices, computed tomography (CT) device, imaging devices, or ultrasound devices, navigation devices, GNSS, event data recorder (EDR), flight data recorder (FDR), automotive infotainment devices, marine electronic equipment (e.g. marine navigation device, gyro compass, etc.), avionics, security devices, vehicle head units, industrial or household robots, drones, ATMs in financial institutions, POS (point of sales) in stores, or Internet of Things devices such as light bulbs, various sensors, sprinkler devices, fire alarms, temperature controllers, street lights, toasters, exercise equipment, hot water tanks, heaters, boilers, etc. In some embodiments, the electronic device may include at least one of a piece of furniture, a portion of a building/structure or a vehicle, an electronic board, an electronic board, an electronic signature receiving device, a projector, or various measuring devices such as water, electricity, gas, or radio wave measuring devices. In some embodiments, the electronic device may be flexible, or may include a combination of two or more of the various devices as described above.

Because the edge computer 530 is able to collect and/or process data by itself, some amount of data otherwise processed by the cloud computing device 520 may be reduced. Accordingly, the overall load placed upon the cloud computing device 520 may be reduced.

Figure 11:
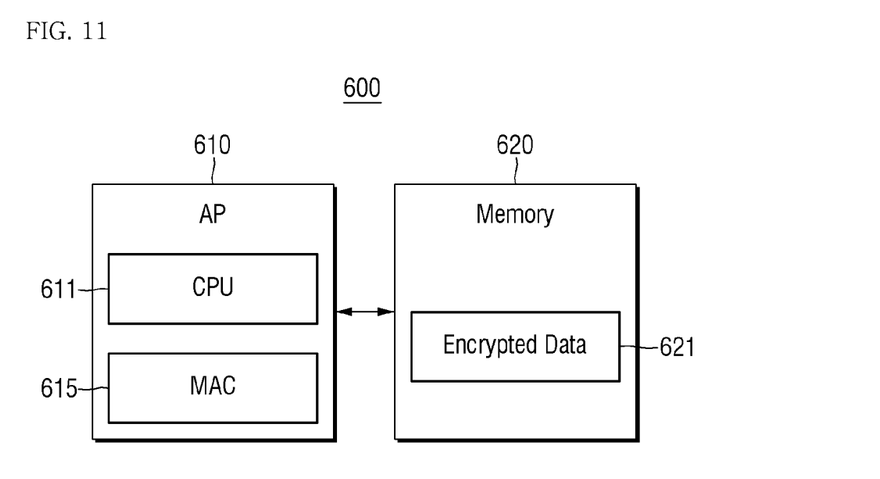
FIG. 11 is a block diagram illustrating an electronic device that may include an artificial intelligence computing device according to embodiments of the inventive concept.

FIG. 11 is a block diagram illustrating an electronic device 600 including an artificial intelligence (AI) computing device according to embodiments of the inventive concept.

The electronic device 600 may include an Application Processor (AP) 610 and a memory 620. The AP 610 may includes a Central Processing Unit (CPU) 611 and an AI computing semiconductor device (MAC) 615 consistent with embodiments of the inventive concept.

The CPU 611 may control the AP 610 and may control the artificial intelligence computing semiconductor device 615 according to some embodiments. For example, the CPU 611 may execute software to control the AP 610 and/or the AI computing semiconductor device 615, and may perform processing or calculations on various data. To this end, the CPU 611 may load various data from a data area in the memory 230 thereon. Alternately, the CPU 611 may write various data into the data area of the memory 620.

In some embodiments, the memory 620 may be embodied as a non-volatile memory. A designated area of the memory 620 may serve as a data area for storing data exchanged with the CPU 611. When performing homomorphic encryption, the size of a cyphertext may be relatively larger than that of plaintext. Thus, in some embodiments, allocating another dedicated area in memory may allow more efficient execution of homomorphic encryption. Another area of the memory 620 may serve as a dedicated area 621 for storing encrypted data - as may be exchanged with the AI computing semiconductor device 615.

In the illustrated embodiment of FIG. 11, the AP 610 is assumed to include the AI computing semiconductor device 615. Alternately, the AI computing semiconductor device 615 may be implemented external to the AP 610. That is, the AI computing semiconductor device 615 may operate in conjunction with and/or independently in relation to the AP 610.

An electronic device including the AI computing semiconductor device according to some embodiments of the inventive concept may be implemented, wholly or in part, as a smart card, a SD card, a MMC, an eMMC, an (eMCP), a PPN, a UFS, a USB drive, a SSD, or an eSSD.

Although embodiments of the present disclosure have been described above with reference to the accompanying drawings, those of ordinary skill in the art will appreciate that the illustrated embodiments may be variously implemented.

What is claimed is:

1. An encryption computing system comprising:
a processor configured to perform calculations between homomorphic encrypted data; and
a non-volatile memory device storing the homomorphic encrypted data, wherein the homomorphic encrypted data includes a plurality of cyphertexts,
wherein the processor is further configured to:
perform a first multiplication between a first cyphertext and a second cyphertext to generate a first intermediate cyphertext;
perform a second multiplication between the first intermediate cyphertext and a third cyphertext to generate a second intermediate cyphertext;
perform a third multiplication between the second intermediate cyphertext and a fourth cyphertext to generate a third intermediate cyphertext; and thereafter,
perform rescaling comprising one or more rescaling calculations on the third intermediate cyphertext using a cumulative scaling factor to generate the homomorphic encrypted data, wherein the cumulative scaling factor is based on a cumulative result of the first multiplication, the second multiplication and the third multiplication,
wherein a number of the one or more rescaling calculations is less than a number of a plurality of multiplications including the first multiplication, the second multiplication, and the third multiplication.

2. The encryption computing system of claim 1, wherein the cumulative scaling factor is a cumulative sum of an exponent of a first scaling factor generated by the first multiplication, an exponent of a second scaling factor generated by the second multiplication, and an exponent of a third scaling factor generated by the third multiplication.

3. The encryption computing system of claim 1, wherein the one or more rescaling calculations include multiplying the third intermediate cyphertext by an inverse of the cumulative scaling factor.

4. The encryption computing system of claim 3, wherein the one or more rescaling calculations include:
multiplying the third intermediate cyphertext by a first unit scaling inverse to generate a first intermediate decrypted value; and
multiplying the first intermediate decrypted value by a second unit scaling inverse to generate the homomorphic encrypted data.

5. The encryption computing system of claim 4, wherein an absolute value of the first unit scaling inverse has a scaling factor less than an exponent of the cumulative scaling factor and greater than an absolute value of the second unit scaling inverse, and
the absolute value of the second unit scaling inverse is a natural number greater than 1.

6. The encryption computing system of claim 1, wherein the processor is configured to perform calculations between the homographic encrypted data by performing the one or more rescaling calculations and the plurality of multiplications.

7. An encryption computing system comprising:
a processor configured to receive data and perform homomorphic encryption on the data to generate homomorphic encrypted data; and
a non-volatile memory device storing the homomorphic encrypted data and storing a cyphertext calculation program, wherein the homomorphic encrypted data includes a plurality of cyphertexts,
wherein the processor is configured to:
successively perform N multiplication calculations on the plurality of cyphertexts to generate an intermediate cyphertext; and
perform M rescaling calculations on the intermediate cyphertext,
wherein M is less than N, where each of N and M is an integer greater than or equal to 1, and
wherein the processor is configured to perform the homomorphic encryption on the data to generate the homomorphic encrypted data by:
performing a first multiplication on a first cyphertext, to generate a second cyphertext having a first scaling factor,
performing a second multiplication on a third cyphertext having a second scaling factor different from the first scaling factor, wherein the second multiplication comprises multiplying the third cyphertext by an additional scaling factor corresponding to a difference between the first scaling factor and the second scaling factor, to generate a fourth cyphertext, and
generating a fifth cyphertext having a third scaling factor by adding the second cyphertext and the fourth cyphertext.

8. The encryption computing system of claim 7, wherein the first multiplication and the second multiplication comprise multiplication with respective different coefficients.

9. The encryption computing system of claim 7, wherein at least one of the M rescaling calculations includes multiplying the fifth cyphertext by an inverse of the third scaling factor.

10. The encryption computing system of claim 7, wherein at least one of the M rescaling calculations includes:
   multiplying the third scaling factor by a first unit scaling inverse to generate an intermediate decrypted value; and
   multiplying the intermediate decryption value by a second unit scaling inverse to generate the homomorphic encrypted data.

11. The encryption computing system of claim 10, wherein the first unit scaling inverse is greater than the second unit scaling inverse.

12. The encryption computing system of claim 7, wherein the processor comprises:
   a first module configured to perform an Inverse Number Theory Transform (INTT) calculation;
   a second module configured to perform a Ring calculation on a calculation result of the first module;
   a third module configured to perform a Number Theory Transform (NTT) calculation on a calculation result of the second module; and
   a fourth module configured to perform a Ring calculation on a calculation result of the third module,
   wherein the first module, the second module, the third module and the fourth module are further configured to perform the M rescaling calculations.

13. The encryption computing system of claim 12, wherein the first module is further configured to perform k INTT calculations, where k is an integer greater than 1, and
   the third module is further configured to perform (N−k) NTT calculations, wherein N is an integer greater than k.

14. The encryption computing system of claim 13, wherein the fourth module is further configured to perform the N multiplication calculations, and
   the second module is configured to perform [k (N−k)] Ring calculations.

15. A server comprising:
   a controller configured to communicate with another server, perform homomorphic encryption on received data to generate homomorphic encrypted data including a plurality of cyphertexts, and decrypt the homomorphic encrypted data; and
   a memory device storing the homomorphic encrypted data,
   wherein the controller is configured to:
   perform N multiplication calculations between at least two cyphertexts among the plurality of cyphertexts to generate an intermediate cyphertext, wherein the N multiplication calculations comprises:
      a first multiplication between a first cyphertext and a second cyphertext to generate a first intermediate cyphertext, and
      a second multiplication between the first intermediate cyphertext and a third cyphertext to generate a second intermediate cyphertext; and thereafter,
   perform M rescaling calculations on the intermediate cyphertext using a cumulative scaling factor that is based on a cumulative result of the N multiplication calculations,
   wherein M is less than N,
   wherein each of N and M is an integer greater than or equal to 1.

16. The server of claim 15,
   wherein the first intermediate cyphertext has a first scaling factor; and
   wherein the third cyphertext has a second scaling factor different from the first scaling factor.

17. The server of claim 15, wherein the controller is configured to perform the M rescaling calculations by:
   for N equal to or greater than 10, performing a first rescaling calculation N/10 times;
   for N less than 10, performing a first number of second rescaling calculations, wherein the first number is equal to a current scaling factor divided by 5; and
   if a result of the first rescaling calculation is less than 10, performing the first number of second rescaling calculations.

18. The server of claim 15, wherein the controller comprises:
   a multiplication module configured to perform the N multiplication calculations;
   a first module configured to perform an Inverse Number Theory Transform (INTT) calculation;
   a second module configured to perform a Ring calculation on a calculation result of the first module;
   a third module configured to perform a Number Theory Transform (NTT) calculation on a calculation result of the second module; and
   a fourth module configured to perform a multiplication calculation and an addition calculation on a calculation result of the third module.

19. The server of claim 18, wherein the first module is further configured to perform k INTT calculations, where k is an integer greater than 1, and
   the third module is further configured to perform (N−k) NTT calculations, wherein N is an integer greater than k.

20. The server of claim 19, wherein the fourth module is further configured to perform the N multiplication calculations, and
   the second module is further configured to perform [k (N−k)] Ring calculations.

* * * * *